Figures 1, 2:
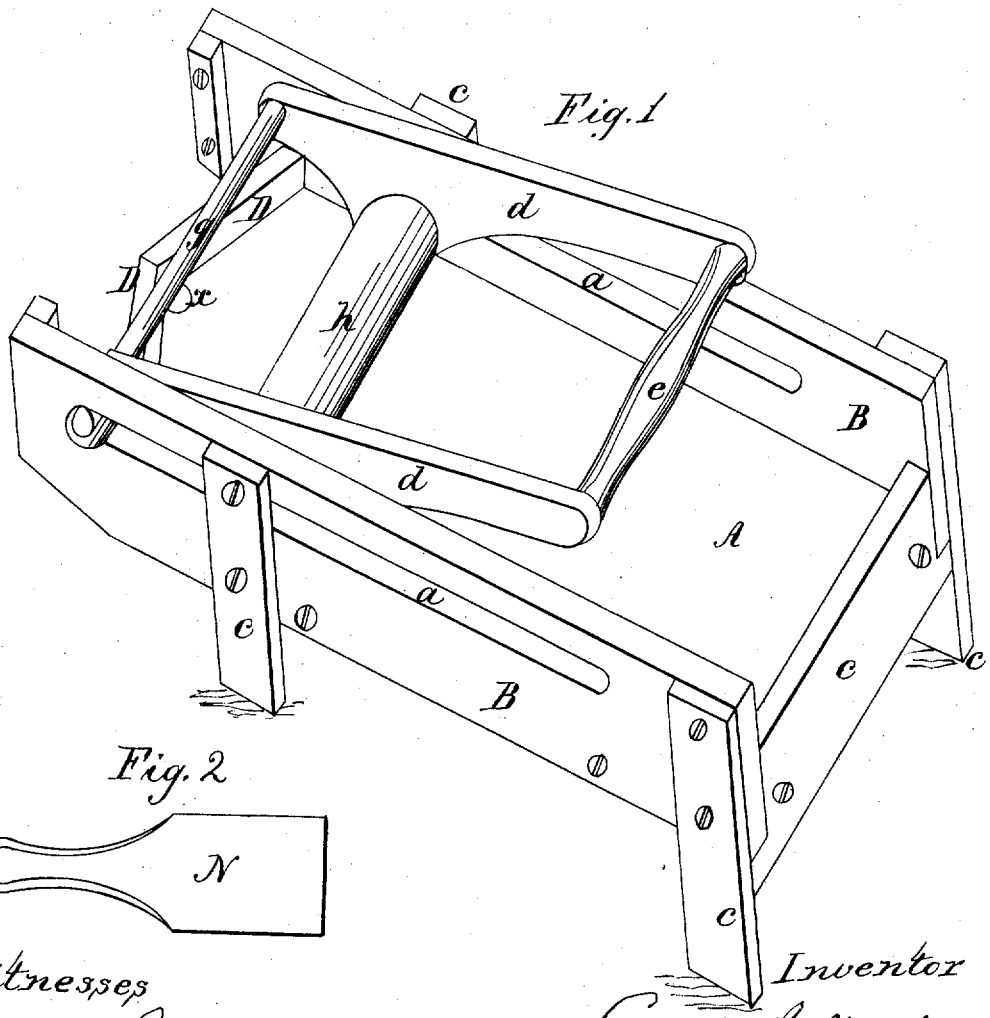

E. P. Walker,
Butter Worker.

No. 3,943. Reissued Apr. 26. 1870.

Witnesses

Cornelius Cox

Chas. Bury

Inventor

Emory P. Walker per

Alexander Evason

Atty

N. PETERS, PHOTO-LITHOGRAPHER, WASHINGTON, D.C.

UNITED STATES PATENT OFFICE.

EMORY P. WALKER, OF BELCHERTOWN, MASSACHUSETTS.

IMPROVEMENT IN BUTTER-WORKER.

Specification forming part of Letters Patent No. 77,135, dated April 21, 1868; reissue No. 3,943, dated April 15, 1870; application filed April 7, 1870.

*To all whom it may concern:*

Be it known that I, EMORY P. WALKER, of Belchertown, in the county of Hampshire, and in the State of Massachusetts, have invented certain new and useful Improvements in Butter-Workers; and I do hereby declare that the following is a full, clear, and exact description thereof, reference being had to the accompanying drawings, and the letters of reference marked thereon:

In the annexed drawings, making a part of this specification, A represents the bottom of a rectangular box or frame having a hole, *x*, through it near the front end; B B, the sides of the same, provided with slots *a a*, extending nearly the whole length of them; C, one end of the frame, the top being cut away as low as the lower sides of the slots *a a*, and D D the front end pieces, placed diagonally so as to form an apex at their intersection, in the middle of the bottom A, and just in front of the hole *x*. The whole is supported by suitable legs *c c c c*, the two in front sufficiently shorter than the others to give the desired pitch or inclination to the frame. *d d* represent arms or holders framed together by the handle *c'* at one end, and the guide-bar *g* at the other, which extends through the sides B B, and slides backward and forward in the slots *a a*. A roller *h* is adjusted into arms *d d*, and works on the face of the bottom A to press and thoroughly work buttermilk or other liquids out of butter, or mix different grades or colors of butter, making the mixture a homogeneous mass, and of uniform color. The pieces D D are designed to hold the butter from being pushed over the end of the bottom A, and to conduct the water or other liquid to the hole *x*. N represents a paddle to handle the butter with, so that it is unnecessary to touch the butter at all with the hands.

What I claim as my invention, and desire to secure by Letters Patent, is—

The arms *d d* constructed with the guide-bar *g*, sliding in the slots *a a*, in combination with the adjustable roller *h*, bottom A, flanges D D, placed at the mouth or front end A, and hole *x*, when all the parts are constructed and arranged with reference to a butter-worker, and operated substantially as described.

EMORY P. WALKER.

Witnesses:

T. C. CONNOLLY,

F. A. LEHMANN.